(12) United States Patent
Parker et al.

(10) Patent No.: US 10,556,843 B2
(45) Date of Patent: Feb. 11, 2020

(54) PROCESS FOR PRODUCING HYDRO-MULCH COMPOSITION FROM MUCK

(71) Applicants: Robert Parker, Milton, KY (US); James A. Grider, Louisville, KY (US); James Nichols, Louisville, KY (US); Kevin Riggle, Louisville, KY (US)

(72) Inventors: Robert Parker, Milton, KY (US); James A. Grider, Louisville, KY (US); James Nichols, Louisville, KY (US); Kevin Riggle, Louisville, KY (US)

(*) Notice: Subject to any disclaimer, the term of this patent is extended or adjusted under 35 U.S.C. 154(b) by 31 days.

(21) Appl. No.: 15/469,254

(22) Filed: Mar. 24, 2017

(65) Prior Publication Data

US 2018/0065897 A1 Mar. 8, 2018

Related U.S. Application Data

(63) Continuation-in-part of application No. 14/545,300, filed on Apr. 20, 2015, now abandoned.

(60) Provisional application No. 61/995,738, filed on Apr. 18, 2014.

(51) Int. Cl.
| | |
|---|---|
| *C05G 3/04* | (2006.01) |
| *C05F 3/00* | (2006.01) |
| *C09K 17/52* | (2006.01) |
| *C05F 7/00* | (2006.01) |
| *C05G 3/00* | (2020.01) |
| *A01G 13/02* | (2006.01) |

(52) U.S. Cl.
CPC ........... *C05G 3/04* (2013.01); *A01G 13/0262* (2013.01); *C05F 3/00* (2013.01); *C05F 7/00* (2013.01); *C05G 3/0076* (2013.01); *C09K 17/52* (2013.01)

(58) Field of Classification Search
CPC .... C05F 3/00; C05F 7/00; C05F 11/00; C05C 11/00; A01G 13/0262; C05G 3/04; C05G 3/0076; C09K 17/52; Y02A 40/205; Y02A 40/284; Y02P 20/145
See application file for complete search history.

(56) References Cited

U.S. PATENT DOCUMENTS

| | | |
|---|---|---|
| 4,210,680 A | 7/1980 | Dawson |
| 4,934,094 A | 6/1990 | Walton |
| 4,951,882 A | 8/1990 | Ober |
| 5,802,763 A | 9/1998 | Milstein |

(Continued)

*Primary Examiner* — Jennifer A Smith
(74) *Attorney, Agent, or Firm* — Carrithers Law Office, PLLC; David W. Carrithers (57) ABSTRACT

A combination of mulch and sterilized organic fertilizer is provided for hydro seeding and hydro-mulching for seed establishment and erosion control. The composition includes hammer milled straw, horse manure and urine, sterilized with heat and processed to provide an optimal particle size. The incorporation of horse manure utilizes a dispersible natural fertilizer collected and processed within a certain time frame which provides an efficient method of recycling "green" horse manure" and liquid waste having a higher acidity than decomposed animal waste. Tackifiers and flocculants such as ground paper aid pumpability and help tack the straw fibers to the ground. The equipment includes a gas heat source, a dryer vessel and a processing unit. The dryer vessel receives the bedding composed of straw and manure for contact with the heated gases to convert the same to a sterilized dry material.

24 Claims, 9 Drawing Sheets

(56) References Cited

U.S. PATENT DOCUMENTS

| | | |
|---|---|---|
| 6,264,715 B1 | 7/2001 | Lamour et al. |
| 6,497,742 B2 | 12/2002 | Lamour et al. |
| 7,024,796 B2 | 4/2006 | Carin et al. |
| 7,059,083 B2 | 6/2006 | Abitz et al. |
| 7,258,922 B2 | 8/2007 | Hesse et al. |
| 7,617,617 B2 | 11/2009 | Gorbell |
| 2002/0078623 A1 | 6/2002 | Raddon |
| 2006/0010712 A1* | 1/2006 | Carin .................. C05F 3/00 34/443 |
| 2011/0011544 A1 | 1/2011 | Gerber et al. |
| 2011/0160058 A1 | 6/2011 | Fedkenheuer et al. |

\* cited by examiner

PROCESS FOR PRODUCING HYDRO-MULCH COMPOSITION FROM MUCK

CROSS REFERENCES TO RELATED APPLICATIONS

This application claims priority from and is a continuation in part of U.S. application Ser. No. 14/545,300 filed on Apr. 20, 2015 which claim priority from Provisional Application Ser. No. 61/995,738 filed on Apr. 18, 2014 both of which are incorporated by reference in its entirety.

FIELD OF THE INVENTION

The present invention relates to the field of erosion control and seed establishment with hydro seeding and hydromulching.

BACKGROUND OF THE INVENTION

The intensive use of agricultural and horticultural areas requires fertilisers to be added for optimal production of grasses or crops. Mineral fertilisers added can compensate for the used up nutrients; however, the product is expensive and is applied in powder or more typically applied in pellet form by drill, broadcase, or liquid application means directly to the field where at least a portion is susceptible to dissolving in rain and running into ponds, streams, rivers, lakes and other areas of the drainage ecosystem resulting in undesirable algae bloom and contamination. Fertilizing exclusively on the basis of mineral fertilisers has, however, the disadvantage that no organic substance is supplied to the intensively used soil. Organic substance in the soil is important for the preservation of fertility. For this reason humus-forming organic substance is added time and again at regular intervals as a soil improving measure. Animal manure has proved to be especially suitable. However, handling animal manure requires a great deal of work and the stench can cause nuisance, particularly in allotments.

Existing systems for erosion control and seed establishment use paper, wood such as sawdust, paper/straw/jute combinations to provide a hydro mulch composition. These hydro mulches are difficult to use and have low performance efficiencies. Additionally, application of paper and wood hydro mulches is limited by the amount of water that can be carried on a hydro mulch spreader. Generally, paper and wood hydro mulches require large quantities of water for efficient spreading. Use of straw mulches has not been successful in hydro seeding. All of these compositions typically require liquid or fertilizer to be applied simultaneously with or added to the mulch to enhance the growth of grass in the mulched areas. Moreover, the clogging of the pumps and nozzles during hydro seeding and hydromulching is a problem that needs to be addressed by control of the particle size.

Conventional methods of applying paper or wood hydro mulches spread seed and mulch by using truck mounted pumps and water cannons for large area applications. The composition of the present invention is dried and sterilized and may be bagged and sold in garden centers and the like with little or no objectionable odor so long as the product is packaged in a moisture proof or resistant container, box, or bag. The product is useful in hot houses, flower gardens, and homes in addition to road side commercial application for control of drainage and erosion.

There is an emphasis in developed countries on the production of food crops by use of certified organic crop production processes and materials. The United States and other countries have developed standards for qualifying food products as "organic" or "organically produced," and several certifying organizations and government agencies exist to certify farms and market produce as "organic" under the appropriate standards. The concept underpinning "organic" food and crop production is that the inputs used in crop or animal production (fertilizer, seeds, feeds, sprays, etc.) are allowed to contain only minimal levels of certain approved non-natural materials, such as synthetic chemical fertilizers, genetically modified organisms. The food products are not allowed to contain any amount of designated undesirable materials, such as pesticides, drugs, growth hormones, pathogens.

There is rapidly increasing consumer demand for organic products. The "certified organic" labeling and terminology has been developed to define products or produce certified by recognized organizations as meeting the applicable agency standards and product or produce made by methods that meet the agency standards for organic production methods. An essential aspect of certified organic food production is the necessity of using production means that are certified organic, such as fertilizers, which are either approved, such as materials containing no pathogens or other disqualifying components, or regulated and accepted, such as manures, composts and the like that meet the applicable standards.

There is a substantial need for environmentally and economically acceptable technologies for disposal of manure, for control of noxious and greenhouse gases from animal feeding operations, and for production of organic fertilizer and soil builder products that can be certified for food production under established standards for certified organic food production. The present invention is directed to methods, apparatus, systems and products for these needs.

The natural fertilizers according to the present invention consists of formed and broken horse droppings material and contains among other things essential trace elements, the concentration of which in the soil has fallen off in the soil and particularly on areas intensively used. It contains important primary nutrients, as nitrogen and phosphorus, besides such important micro-nutrients like selenium and iodine.

Examples of the prior art and publications that have addressed the production of organic or certified organic fertilizer products are U.S. Pat. No. 5,354,349 to Inoue; U.S. Pat. No. 6,461,399 to Connell; U.S. Pat. Nos. 6,517,600 and 6,645,267 to Dinel; U.S. Patent Applications 2003/0038078 by Stamper et al., 2003/0089151 and 2003/0136165 by Logan et al., and 2003/0111410 by Branson.

SUMMARY

A hydro-seed and hydro-mulch bedding composition containing straw and fresh horse manure, a tackifier such as guar, starch or other water soluble polymer and flocculent such as polyacrylamide "PAM". The fresh undecomposed horse manure and straw mixture is dried and chopped into a suitable size for suspension in water and distribution through a pump. The straw containing horse manure provides an inexpensive fertilizer for hydro-seeding and for seed establishment and erosion control. The product can be contained in sacks, baled, or bulk and can be diluted with water and sprayed over bare ground with seed and fertilizer in a slurry to establish ground cover which provides shade to seedlings and retain moisture. The process utilizes one or more cyclones and tower dryers having a series of shelves to dry the mulch materials at from about 200-350° F. for up to 15 minutes and more preferably from about 1 to 10 minutes and more preferably from about 2-6 minutes to control humidity, odor, and effectively sterilize any weed seeds or other plant seeds found in the composition. The resident time will vary according to volume and throughput, but is calculated to effectively kill any seeds found in the muck or organic waste material in the bedding including waste hay. The mixture is moved through the system using at least one cyclone and dryer unit. Thus, horse muck consisting of used bedding having a high moisture is processed into a mulch and fertilizer product which adds nutrients and provides a means to reduce the amount of chemical fertilizer used in the mixture.

A combination of mulch and sterilized organic fertilizer in the form of horse muck is provided for hydro seeding and hydromulching for seed establishment and erosion control. The composition includes hammer milled straw, horse manure and urine, sterilized with heat and processed to provide an optimal particle size. The incorporation of horse manure utilizes a dispersible natural fertilizer characterized in that the horse droppings excreted by horses are collected and processed within a certain time frame which covers preservation of a natural humidity and loose structure of the horse droppings as much as possible and provides an efficient method of recycling "green" horse manure" and liquid waste having a higher acidity than decomposed animal waste. The final hydro-mulch product is slightly acidic. The hammer milled straw is used for its water holding capacity, pumpability, and reduction in the amount of water required for pumping a quantity of mulch. The large surface area created by pulverizing and pulping and heat treating the straw particles absorbs moisture readily and facilitates transfer of the organic fertilizer chemicals leaching from the hydro-mulch straw product into the ground more readily than fertilizer dissolved in water which can be washed off of the ground surface in a heavy rain or solid pellets of organic waster or fertilizer material which must be broken down by weathering. The hydro-mulch treated product of the present invention adheres to the soil particles creating a physical and chemical interface for moisture and chemical leaching of the organic material into the ground binding it to the ground as it melts and decays over time.

The mulch and fertilizer composition of the present invention may include other additives as well. Tackifiers and flocculants aid pumpability and help tack the straw fibers to the ground and aid in water infiltration and water clarity. A surfactant may be added to enhance wettability. Other additives such as dyes may be used to enhance the appearance of the product. This invention discloses a process for conversion of manure and animal waste to fertilizer and/or soil builder products useful as an ingredient for organic farming operations. The equipment systems includes a gas turbine generator unit as a heat source, a dryer vessel and a processing unit, wherein the connection between the gas turbine and the dryer vessel directs substantially all the gas turbine exhaust into the dryer vessel. The dryer vessel receives the bedding composed of straw and manure for contact with the turbine exhaust gases to convert the same to a sterilized dry material.

The present composition comprises or consists essentially of a straw mixed with horse manure to prepare a mulch for hydro seeding and hydromulching for seed establishment and erosion control. The product is mixed with water and sprayed over bare ground with seed and fertilizer in a slurry to establish ground cover which provides shade to seedlings and retain moisture. The process utilizes a tower dryer having a series of shelves to dry the mulch materials at from 200-350° F. for for up to 15 minutes and more preferably from about 1 to 10 minutes and more preferably from about 2-6 minutes to control humidity, odor, and effectively sterilize any weed seeds or other plant seeds found in the composition and obtain a selected moisture content typically of less than 15% and more preferably about 12% moisture or less. The mixture is moved through the system using a cyclone which enables conveyance of the product without subject the product to blades providing a means for controlling the size of the product throughout the drying and sizing process. Thus is able to utilize horse muck which is used bedding having a high moisture content as a fertilizer in their hydro mulch product which adds nutrients and provides a means to reduce the amount of chemical fertilizer used in the mixture.

The present method utilizes horse manure which is processed together with straw and, if necessary, further additions of synthetic or natural fertilisers. In particular, damp horse manure is used as initial material to which straw or other supplements and other animal dung is added. The advantage of this natural fertilizers made of horse manure is that particularly the addition of straw retards decomposition of the natural fertilizers.

It is an object of the present invention to tumble the feed material including straw and horse muck at extreme heat just at flash point with temperatures between 250 F and 450 F depending on incoming moisture.

It is an object of the present invention to pneumatically convey material drying in hot air stream at speeds between 3500 FPS and 4500 FPS for appropriate breakdown of materials lignins and decontamination of soiled material.

It is an object of the present invention to provide for milling and sizing of the feed material and process same to a dimension no greater than ½" in length and vertical fracturing of material for optimum performance through a hydro seeding machine and perfect blending of complementary ingredients for superior performance on the ground to achieve vegetation and erosion control.

It is an object of the present invention to sterilize any weed seeds present in the mulch and fertilizer composition during the drying process.

It is an object of the present invention to produce a composition which includes ordinary horse manure which consists of straw, urine straw and pieces of horse manure.

It is an object of the present invention to produce a composition which includes horse manure having between 5 and 25 percent moisture and more preferably between 10-20% moisture and most preferably about 10% moisture.

It is an object of the present invention to utilize an inert binder in the product.

It is an object of the present invention to provide a base product using only natural ingredients in the fertilizer.

It is an object of the present invention to provide a mulch including a natural fertilizer which is weed free.

It is an object of the present invention to utilize a wheat straw.

It is an object of the present invention to provide a mulch and fertilizer composition which is biodegradable.

It is an object of the present invention to provide a mulch and fertilizer composition which does not wash off and adheres to the ground.

It is an object of the present invention to provide a mulch and fertilizer composition which has an acidic composition suitable for the acidic soil applications such as for the wine industry or to lower the pH of alkaline soil.

It is an object of the present invention to product mulch particle sizes of one inch or less and more preferably ½ inch or smaller including fines is used to prepare a hydro mulch product.

It is an object of the present invention to product mulch particle sizes up to 10 inches in length for ground cover applications wherein the product is baled.

It is an object of the present invention provide a sterilized product and any seeds therein.

It is an object of the present invention to add hay straw to the product providing protein.

It is an object of the present invention to ship the product in bulk containers.

It is an object of the present invention to produce a product which can be used to produce Kosair food.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein.

DESCRIPTION OF THE PREFERRED EMBODIMENTS

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term "about" can be reasonably appreciated by a person skilled in the art to denote somewhat above or somewhat below the stated numerical value, to within a range of +10%.

Horse stall waste comprising a major amount of straw mixed with a minor amount of horse manure and liquid waste is utilized as a feed material to product a hydro-mulch for hydro-seeding and hydromulching to establish seed beds and control erosion. The product is mixed with water and sprayed over bare ground with seed and optionally a chemical fertilizer in a slurry to establish ground cover whereby the fracture straw fibers and provide shade to seedlings and retain moisture affording a transfer mechanism of the fertilizer to the soil at a slow rate as compared to conventional straw cover. A tackifier such as guar or other water soluble polymer is often used in addition to a flocculent such a polyacrylamide to enhance pumpability and aid in tacking the straw fibers to the ground and each other. The preparation process utilizes a tower dryer having series of shelves and rotating cylinders increasing retention and residence time of the feed mulch material in the dryer which subjects the feed material to dry air at a temperature of about 200 to 350° F. for up to 10 minutes and preferably from about 3 to 5 minutes to control humidity of the product. A novel feature of the process is the ability to utilized fresh or green horse manure waste having a high moisture content as an organic fertilizer in a hydro-mulch product which adds nutrients to the ground and provides a means to reduce the amount of chemical fertilizer used for ground cover operations.

Process:

Wheat straw or other cereal grain straw, such as a oat straw and/or a wheat straw and/or a rye straw and/or a barley straw comprise the majority of the fiber material; however, the bedding material may also contain a minor amount of or any other fibrous plant based material including a flax and/or a hemp and/or a sawdust and/or a paper is typically used for bedding material in the horse industry as well as for other domestic animals including cattle and sheep and for wild animals in zoos and animal habitats. The mixture of waste materials from the animals including manure and urine is collected after becoming saturated with waste and is delivered to the processing plant in walking floor trailers where it is stored in bulk for pneumatic conveyance into a feed system.

Figure 1:
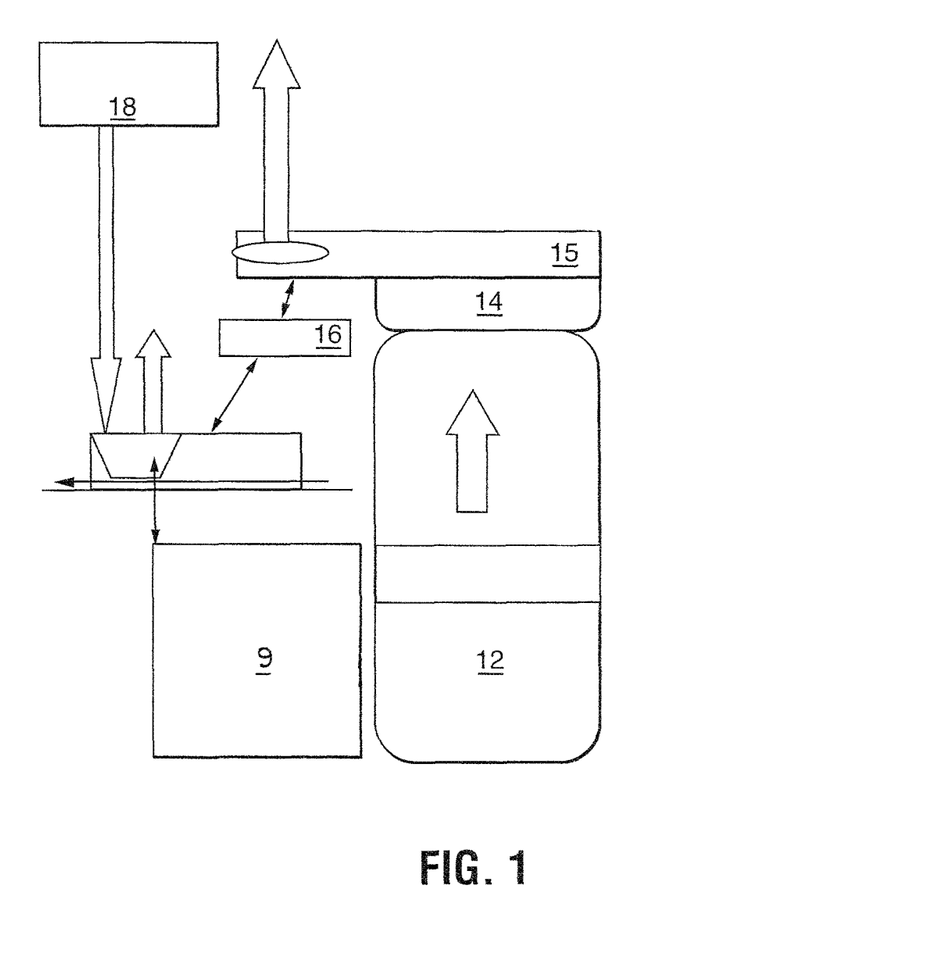
FIG. 1 is a flow diagram showing the rock trap and hot box for the feed system.

As shown in FIG. 1, the bulk feed is fed into the pneumatic conveying system via a live floor feed and break-up mechanism 12 wherein the muck feed 7 is picked up into conveyance air stream and rocks, debris, and other heavy unwanted material is removed via a belt for disposal. Counter rotating spiked beaters 14 break up the much for delivery into the hot air stream and a high speed belt 15 moves the material to a hot box 16 where the feed system conveys the material through a vacuum line which enters a heated air stream. At about 3500 to 4500 feet per second material is delivered to the next stage where the feed material is subject to a 4 million BTU gas fired burner 18. The burner 18 heats the air up to 450° F. and the feed material as it is pneumatically conveyed into the air stream. The burner develops consistent heat of 250° F. to 450° F. for proper decontamination and sterilization of the microorganisms and seeds in the feed material. These temperature ranges also ensure proper break down of the lignins of the material. As shown in the drawings in FIGS. 2 and 11, a plurality of variable speed rotary air locks 319 are used throughout the blower and vacuum conveying system to control the rate of feed.

Figure 2:
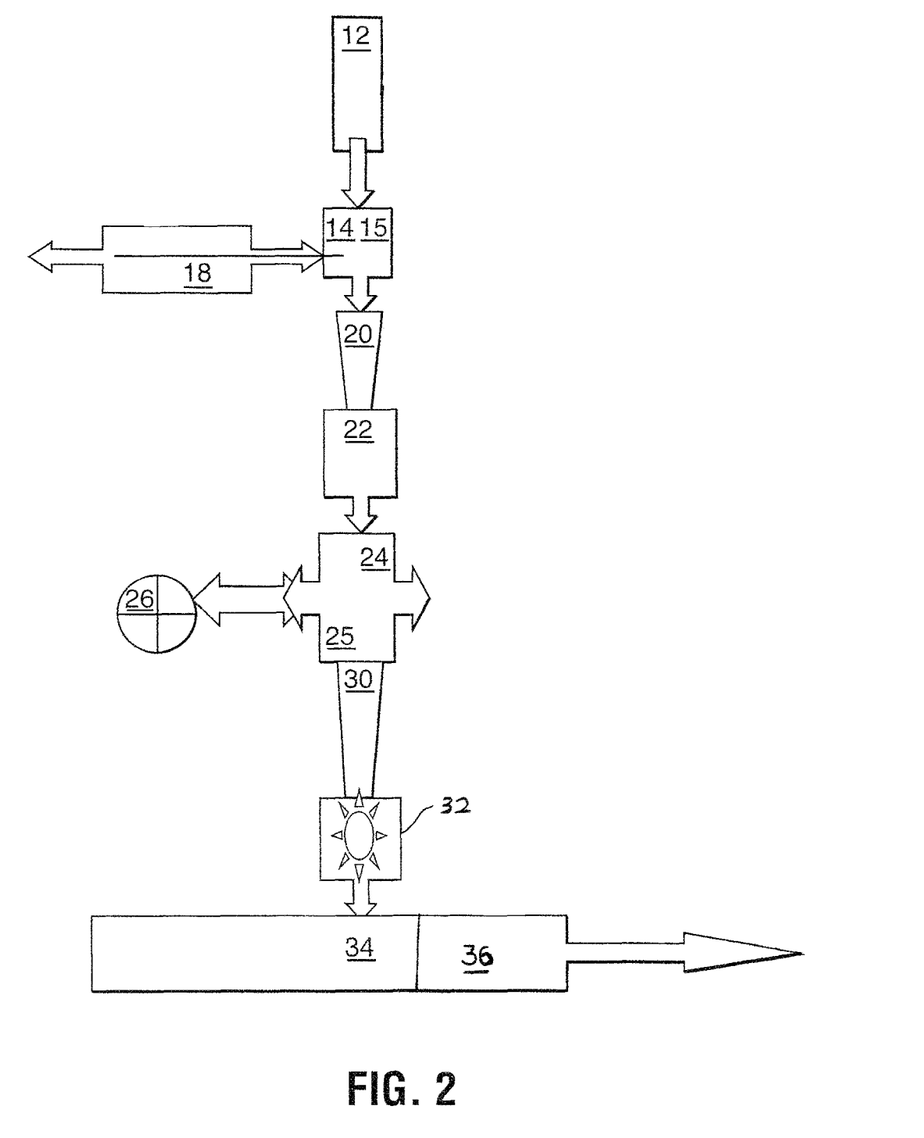
FIG. 2 is a flow diagram of the processing system for treatment of the muck and straw feed material.

As best depicted by the flow diagram in FIG. 2, the horse muck bedding and straw is delivered in walking floor trailers to a feed system having a live floor feed and break-up mechanism 12 including beaters 14 to break up the material which is moved via conveyors 15 to be fed into the pneumatic conveying system. A burner 18 provides the heated air as material is pneumatically conveyed through the drying system. A cyclone removes the moist air and conveys the material to a first cyclone 20 allows moisture and spent air to escape while material collects into a feed control box 22 which feeds material at a consistent feed rate into the hot air stream for processing at a selected residence time through a dryer 24 or dryer box such as a shelf dryer, collider dryer, fountain dryer, or WALKER dryer which includes a rotary cylinders and shelf drying arrangement. Selection of the dryer such as the WALKER dryer is considered an important and novel feature of the process, for the heated material is suspended in a hot air stream at 3500 to 4500 fps as it is conveyed to the dryer achieving a temperature in the dryer of 350 to 400° F. which heats the seeds to at least 200° F. for a selected period of time (usually 3-5 minutes per dryer), which kills any seeds to prevent germination and sterilized the organic product. Sufficient heat is supplied by the dryers wherein each one can be heated to a selected temperature for a selected residence time to provide an effective means to kill any seeds and sterilize the muck product. One to three dryers may be used, preferably at least two depending upon the feed rate and size of the dryer. It takes less time to heat and prepare a product for baling having straw lengths up to 10 inches than a hydro-mulch product having straw lengths averaging one inch or less, and more ¾ of an inch or less and most preferably averaging about ½ inch or less in length. The final product is composed of straw fibers some of which are shredded, pulped, crushed, and frazzled producing the maximum surface area for absorption of water. The drying process includes drying of the material for a selected residence time of from 200 to 300° F. for three to five minutes in the tower dryer conveyed through a series of shelves while the material is subjected to a fibercation and expansion process utilizing fluffing cylinders 25 for enhanced drying, fragmenting, and pulping which expands, splits and creates more fibrous particles of straw increasing the surface area for adsorption of moisture in the subsequent hydro seeding process and absorption of moisture as a ground treatment component. The product forms a superior moisture absorbing material as opposed to straw and/or paper and/or hay and/or other filler material which is crushed, ground to small particles and molded, extruded or formed into pellets or granular material having about the same dimensions.

A feed control air lock system includes a HE-60 pull fan 26 providing a source of moving hot air and material through system. Material travels through the dryer at a selected rate and volume for further drying prior to being fed to a second cyclone 30 for removal of excess moisture and spent air prior to feeding the material into a hammer mill 32.

The material is ground in the hammer mill 32 at approximately 200° F. to a selected size, preferably ½ inch or less. The hammer mills include hammer, screens, and breaker bars or hardened material to resist wear and the abrasiveness of the material. A screen size of ⅝ inch is required to provide a product with ½ inch of size and vertically fracture the straw producing fibrous material to increase the surface area of the particles, increase absorption of moisture and expansion of the particles for application as a hydro mulch material when mixed with water and optionally a chemical fertilizer and/or optionally seed. The air handling fans are special wear fans designed to have a high rpm in order to facilitate the sizing process. The horse muck and wheat straw feed stream is dried below 10% moisture at this stage and cooled to 100° F. or less. Material is vertically fractured from the milling process for optimum performance for its intended use. At this point material, the material is environmentally friendly with a very low moisture and having a physical structure of the cellulose fibers sized and exposed for optimum performance in its intended use.

Figure 10:
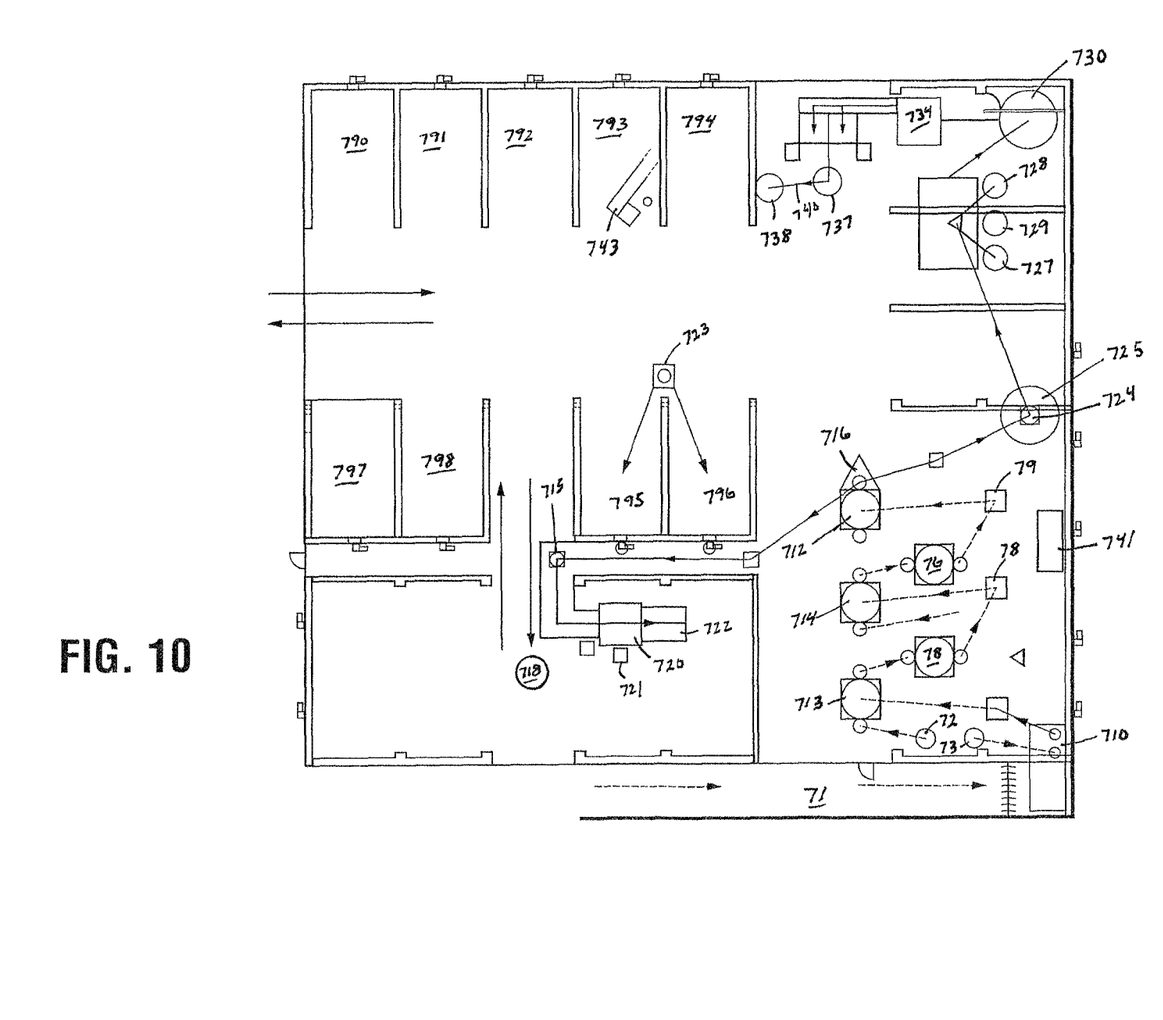
FIG. 10 is a schematic showing the process flow and equipment for one preferred embodiment of the present invention including the following components: hotbox, module feeder, burner, dryer, fan, cyclone, splitter transition, hammer mill, cyclone re-bale, surge bin long, square baler, bale bander, power units, conveyors, screens, surge bin for short straw, unloader bin, product bin, surge bin, unloader for product surge, air compressor, reel mixer, bully bagger, palletizing frame, pallet wrap, conveyer, dust and odor control, moisture controls, bale buster conveyor, mobile equipment, compos bin, peat moss bin, saw dust wood bin, paper bin, cotton bin.

The processed muck material cooled to ambient temperature and deposited into a live floor surge bin 34 for bulk storage and transfer to stationary mixers 40 such as reel mixers 733 at the mixing stations 36 and 38. The floor surge bin is designed to deposit material as needed for mixing.

Figure 3:
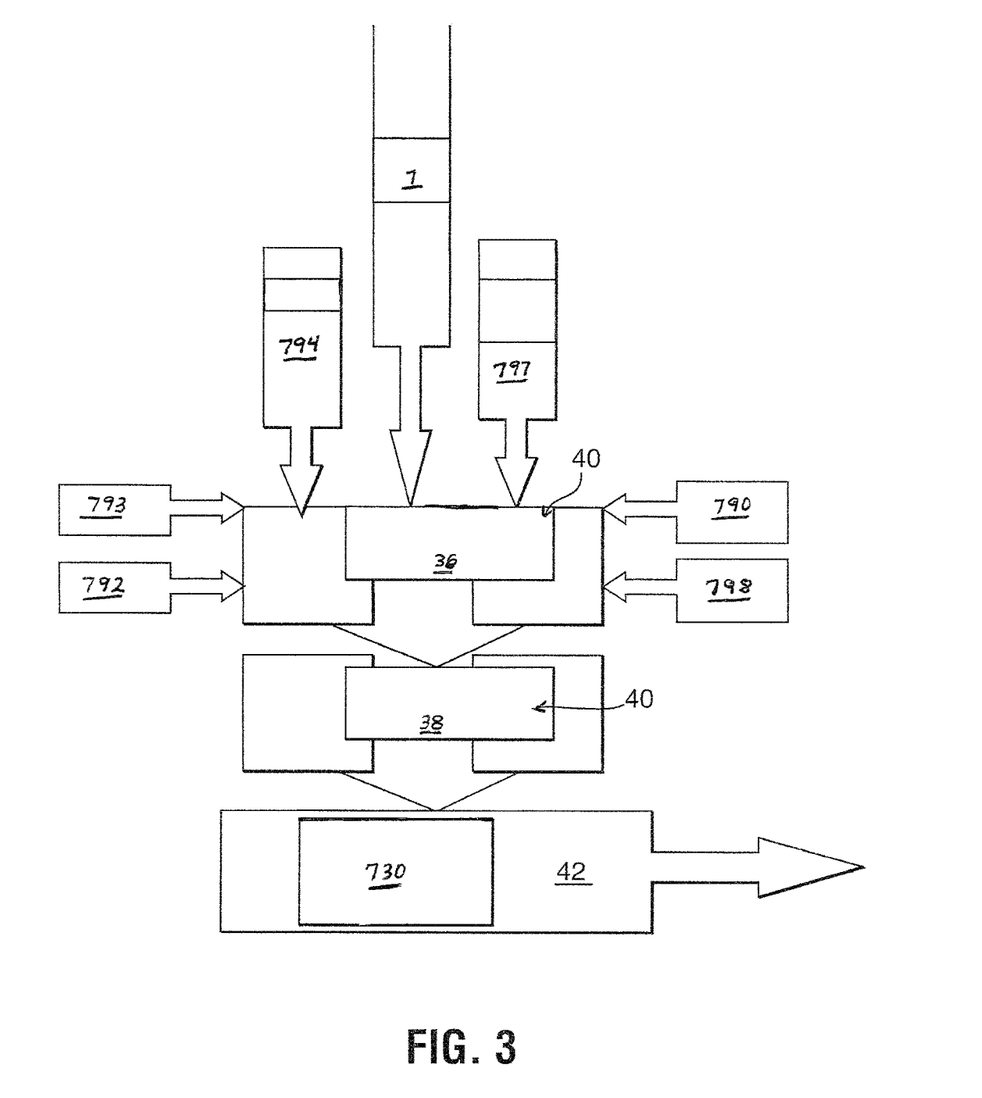
FIG. 3 is a flow diagram of the mixing process.

The mixing station 38 includes at least one and preferably a plurality of mixers such as reel mixers. The stationary mixers 40 are reel or ribbon mixers which include special wipers for better lifting and mixing capabilities. The mixing station includes counter rotating augers in the bottom to continue the blending of said materials while distributing them to the compression bagger or other packaging station. The mixers mix a volume of 300 cubic feet per mixer of the fibrous materials.

Mixers break up and evenly distribute multiple additives with the horse muck with straw for a consistent engineered hydro mulch with organic fertilizer material. As material is deposited into mixer other ingredients of fibrous organic nature can be blended together for particular applications and transferred to a surge bin 42. The ingredients are mixed according to weight and bulk density. The dust prevention is controlled in order to mix the ingredient without lost of specific ingredients to maintain the integrity of the mix formula.

Figure 4:
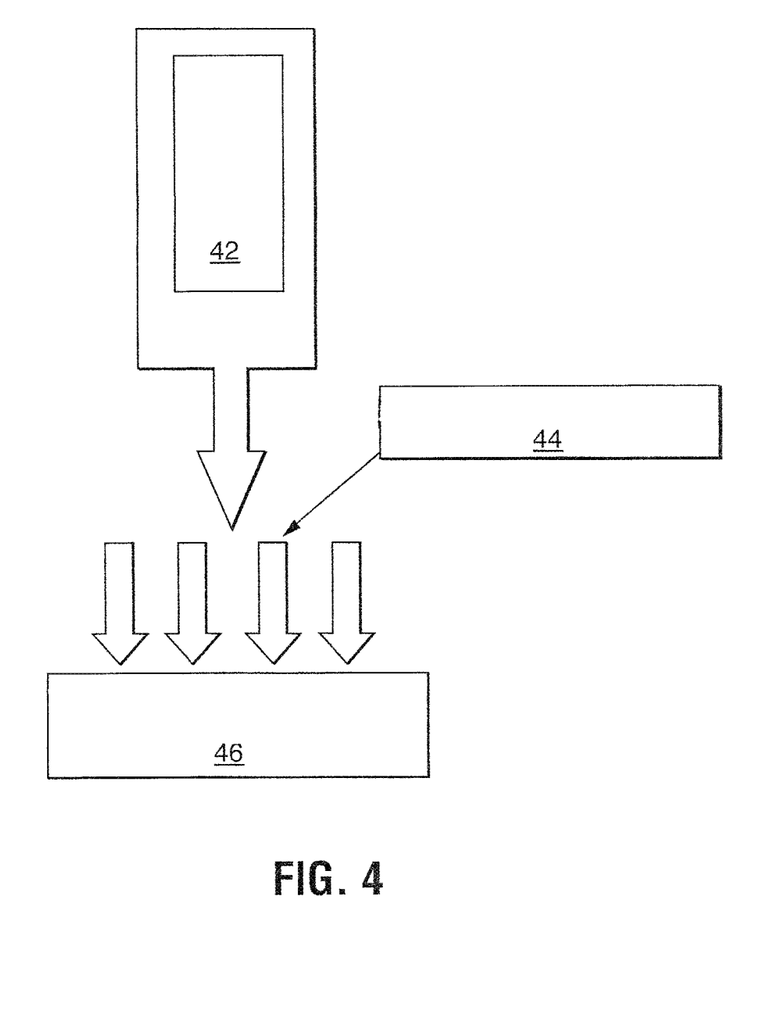
FIG. 4 is a flow diagram of the packaging process.
Figure 5:
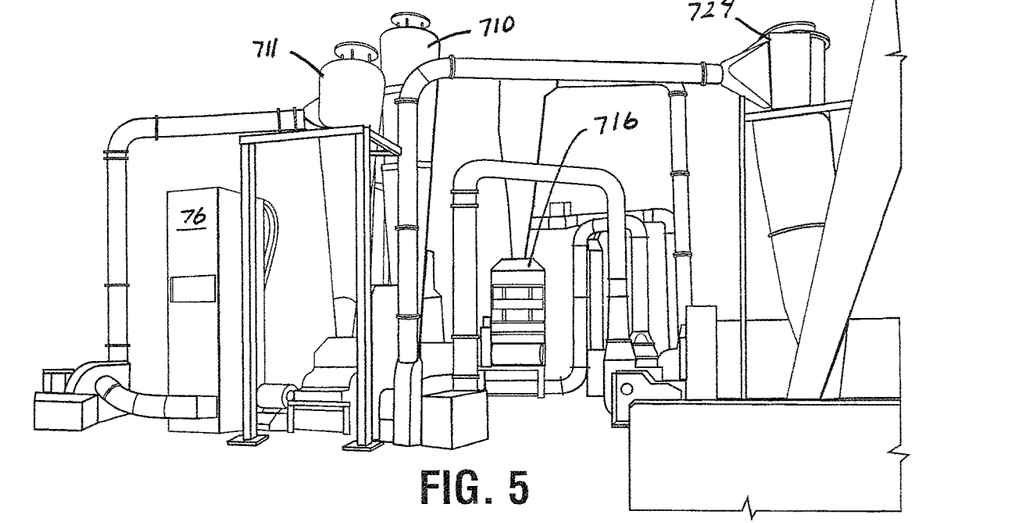
FIG. 5 shows the processing equipment including the cyclones, dryer boxes, hammer mill, and pull fan.
Figure 6:
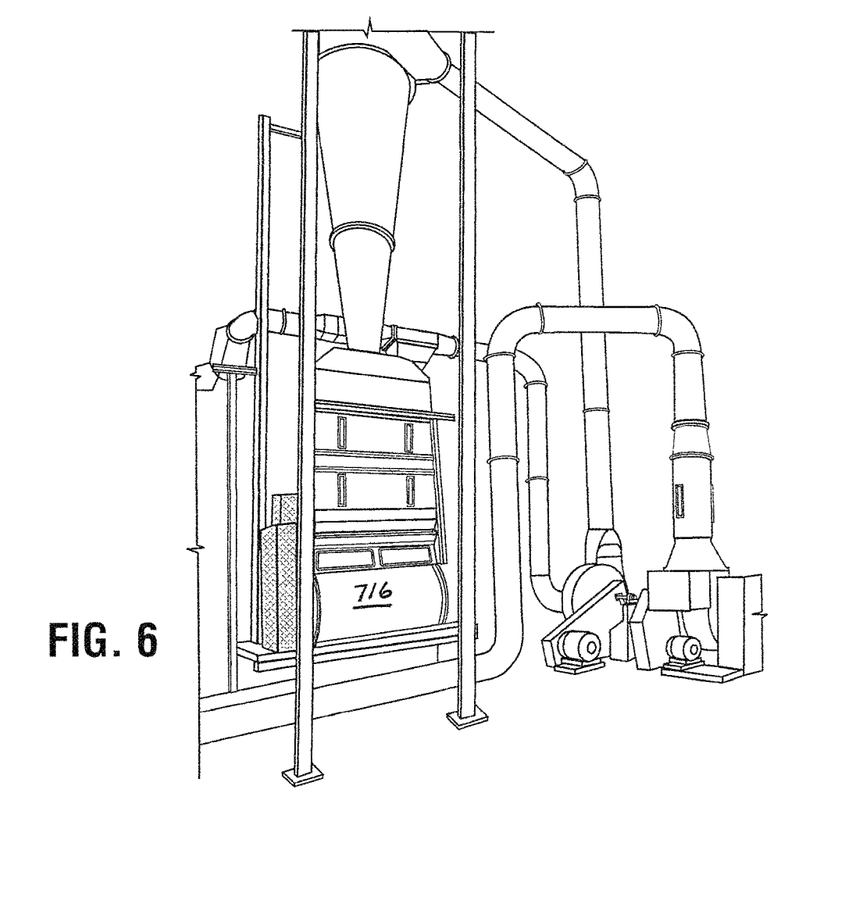
FIG. 6 is a perspective view showing the cyclones, vertical shelf heater, and hammer mill.
Figure 7:
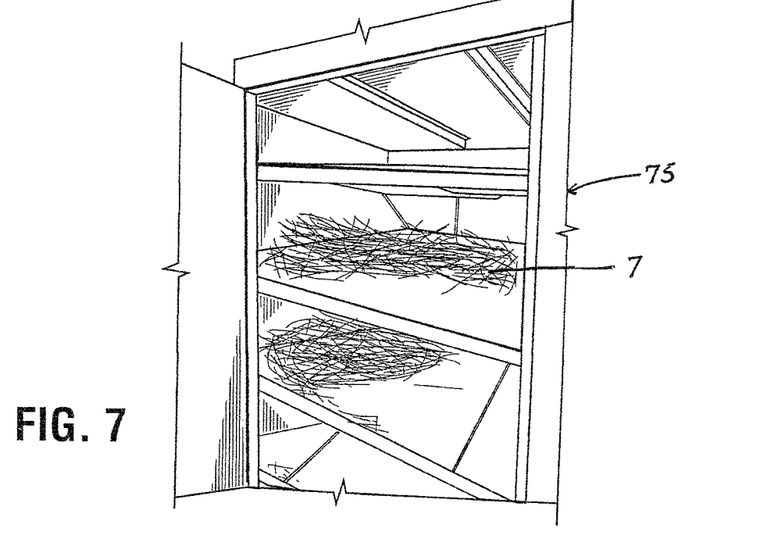
FIG. 7 is a perspective view showing the heater shelves or trays within the dryer box.
Figure 8:
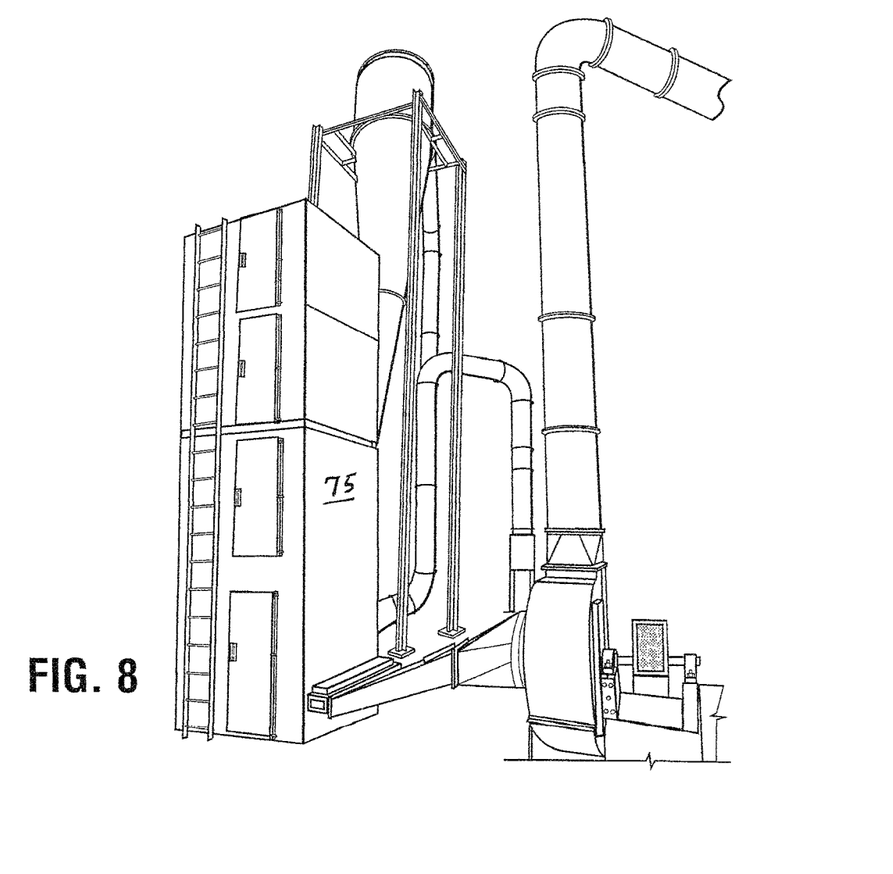
FIG. 8 is a perspective view showing the vertical shelf dryer box and conveyor system.
Figure 9:
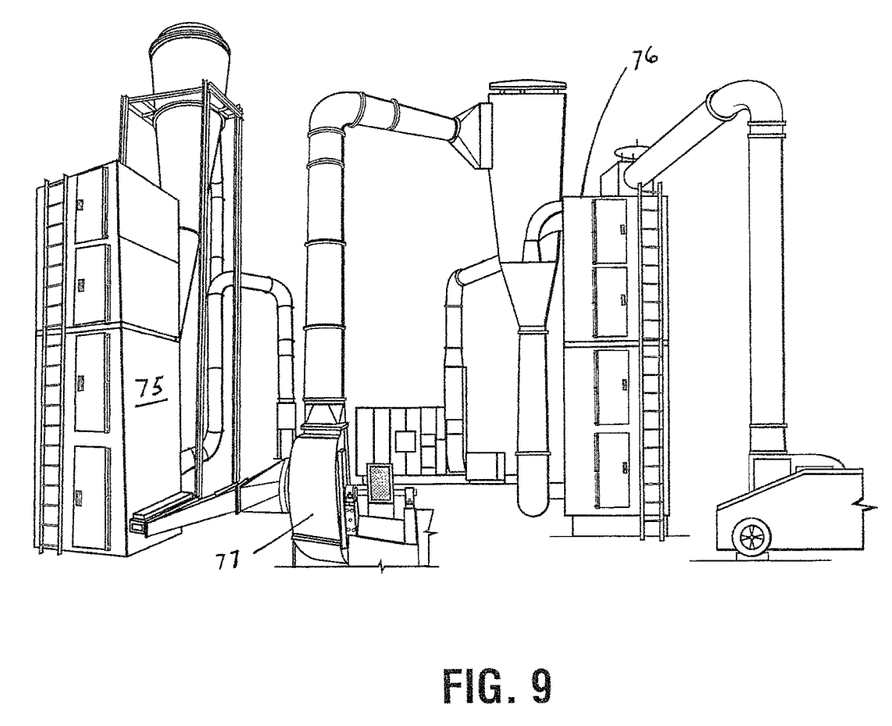
FIG. 9 is a perspective view showing shelf dryer boxes, the cyclones, conveying system, and feed system.

The base horse muck composition containing processed straw, urine, and manure is transferred to containers of a desired volume or weight. For instance, the product may be distributed to a compression bagger station 44 at approximately 7.5 cubic foot of volume where the product is compressed to 2.3 cubic feet of volume and bagged in 50 pound bags ready for transport. The containers are preferably moisture proof and air tight. Moisture and mix variations are adjusted to achieve said weight for specific blends of finished products.

In some applications, the material can be filled in bags, for instance in paper bags, which are then closed or sealed by means of a paper bag sewing machine. Paper bags are pervious to air and environmentally friendly. Material filled in paper bags does not go moldy and preserves the microorganisms due to the air permeability of the paper bags. Both granulated and not granulated material can be dried and mixed in the above-mentioned drying and mixing process.

FIG. 10 shows a schematic of the process flow and equipment for one preferred embodiment of the present invention including the following components: 70 hotbox, 71 module feeder, 72 burner 1, 73 burner 2, 74 burner 3, 75 dryer 1, 76 dryer 2, 77 fan 1, 78 fan 2, 79 fan 3, 710 cyclone 1, 711 cyclone 2, 712 cyclone 3, 713 feed 1, 714 feed 2, 715 splitter transition, 716 hammer mill, 717 cyclone re-bale, 718 surge bin long, 719 square baler, 720 bale bander, 721 power units, 722 conveyors, 723 screens, 724 cyclone for short straw, 725 surge bin for short straw, 726 unloader bin, 727 product bin 1, 728 product bin 2, 729 product bin 3, 730 finished product surge bin, 731 unloader for product surge, 732 air compressor, 733 reel mixer, 734 bully bagger feed, 735 bully bagger 1, 736 bully bagger 2, 737 palletizing frame, 738 pallet wrap, 739 convener, 740 conveyors, 741 dust and odor control, 742 moisture controls, 743 bale buster conveyor, 744 mobile equipment, 790 bin 1 compost, 791 peat moss, 792 bin 2 wood, 793 bin 3 paper, 794 bin 4 cotton, 795 bin 5 cotton, 796 bin, 798 alfalfa/meal and 797 soil chem bin.

Figure 11:
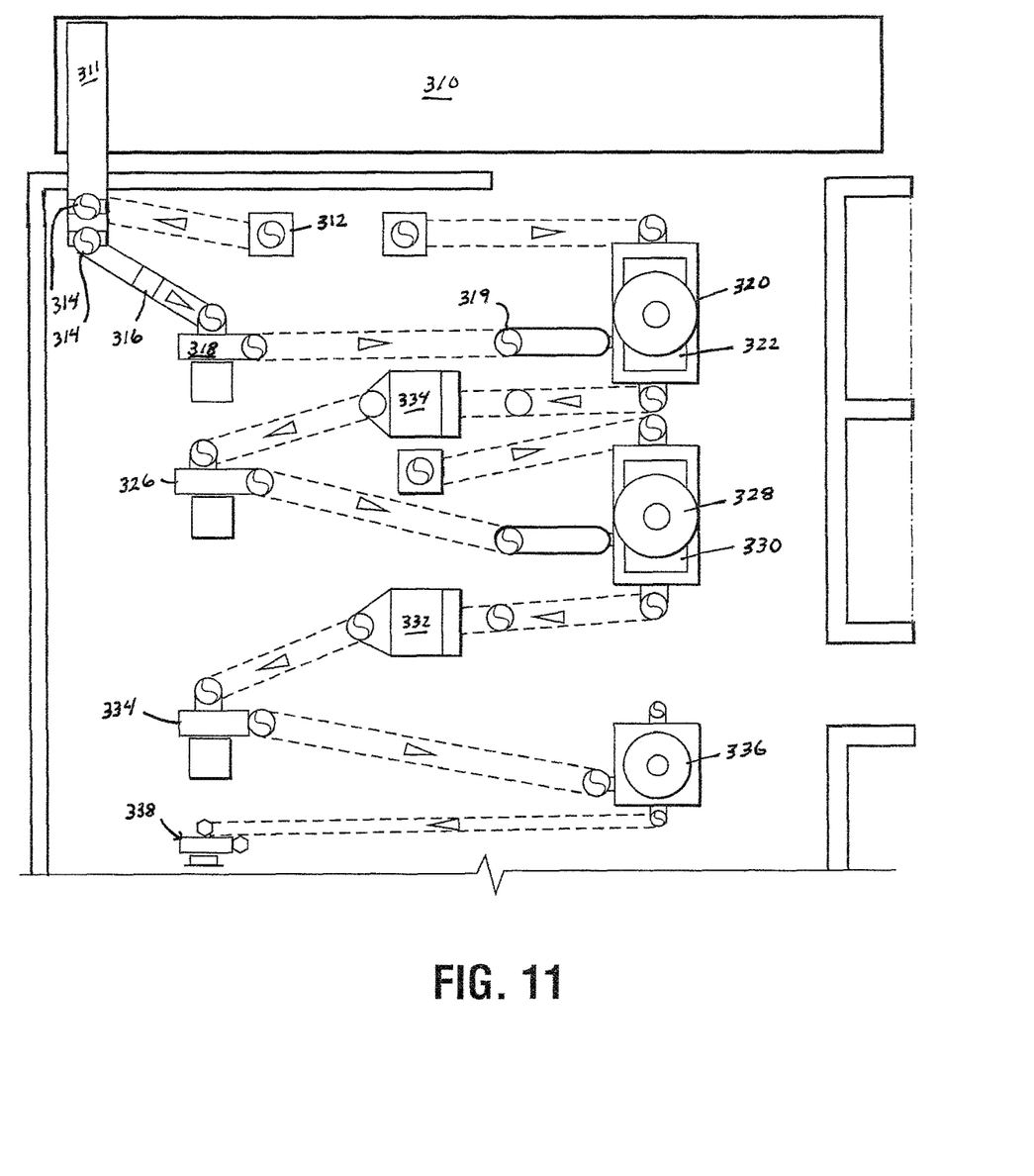
FIG. 11 is a schematic showing an alternate embodiment process flow diagram including a module feeder, conveyor, a heater, a hot air fan, a rotary air lock to control feed rate, a blower, a cyclone, a hammer mill, a hot air shelf dryer, a blower, a cyclone, a hammer mill, a hot air shelf dryer, a blower, a cyclone, and a bagger.

FIG. 11 is a schematic showing an alternate embodiment process flow diagram including the following major components: 310 module feeder, 311 conveyor, 312 heater, 314 hot air fan, 316 rotary air lock to control feed rate, 318 blower, 319 variable speed rotary air lock, 320 cyclone, 322 hammer mill, 324 hot air shelf dryer, 326 blower, 328 cyclone, 330 hammer mill, 332 hot air shelf dryer, 334 blower, 336 cyclone, and 338 bagger. The module feeder holds the muck and provides it to the conveyor belt. A fan pulls hot air form the hot box which is mixed with the muck and blown through an air lock which controls the feed rate to the blower which blows the material to a cyclone or cyclone/hammer mill unit to reduce the size of the straw fragments. The material is then blown to a vertical shelf dryer for a selected residence time in the dryer at a selected temperature. The material is sucked into a blower and transferred to a second cyclone and/or cyclone/hammer mill then conveyed to a second shelf dryer for a selected residence time at a selected temperature. A fan conveys the dried material to a third cyclone whereby the material is conveyed to a packaging station for bulk container storage or bagging. Composition:

The base composition of the horse muck of the present includes wheat straw, manure and urine; however, it is contemplated that the horse could also contain some hay, sawdust or other contaminants in small amounts. The straw is typically from grain crops, such as barley, oats, or wheat. Any hay straw or wood chips in the muck would be considered a contaminant rendering the composition less effective.

The wheat straw typically contains 13% nitrogen, 3.3% phosphorous, and 23% potassium. The horse muck typically contains 14.9% nitrogen, 45% phosphorus, and 13.2% potassium. One ton of straw horse muck contains: 1600 pounds of H2O, 10 pounds of nitrogen, 5 pounds of phosphorus, 101 lbs of potassium. Horse urine contains 3 pounds of nitrogen, and 3 pounds of potassium. According to an assay sample from Ohio State University, the horse muck sample contained 70.8% water, 0.51% nitrogen, 0.21% phosphorus, and 0.68 to 0.90% potassium. A 1000 pound horse makes 50 pounds of manure a day and 10 pounds of urine a day which equates to 20 pounds of soiled bedding (muck) a day. The density of the wheat straw is 2.5 pounds per cubic foot which has a capacity to absorb 2.2 pounds per 20 pounds of straw.

Usually about 100-150 pounds of straw is used to absorb about 60 pounds of animal waste a day. Thus, the content of the waste products in the straw will vary, but typically muck will contain from 0.1 up to 20% by wt. organic manure waste, more preferably from 0.2 to 15% by weight organic manure waste, more preferable from about 0.3 to 10% by weight organic manure waste, and more preferably from 0.1 to 5% by weight organic manure waste, and 80 to 95 percent straw. Upon drying the final hydro-mulch product typically contains about 95 to 99 wt. % straw but depending upon the application, the muck product may contain 0.1 to 5 wt. % dried waste material and 95 to 99.9 wt. % straw or other natural fibrous material.

Treatment of the horse muck according to the process described herein pulverizes and fragments the straw increasing the surface area and adsorption area of the straw particles allowing longer straw particles up to ½ inch long to be used which forms a bridge between the straw and paper particles upon deposition on the ground surface to be treated as compared to the conventional hydro mulch using straw particles of a smaller size of about ¼ inch because the straw is processed with using conventional equipment which mixes but does not fragment or pulp the straw segments.

Pre-ground additives of shredded or pulped paper, and/or wood shavings, and/or cotton may optionally be added to the horse muck composition, but is not necessary.

Paper can be added to the processed horse muck in the mixing stage as shown in FIG. 3 in an effective amount to retain water in the composition to form a slurry for spreading the hydro-mulch composition by pumping the composition onto the surface to be treated. The paper is usually ground into small particles of less than ½ inch and preferably even smaller and mixed with the horse muck composition. The paper holds the water to hold the horse muck straw mixture into a slurry solution better than a horse muck solution using straw alone because the water does not remain in solution with the straw to form as stable a solution for pumping as when the mixture contains from 0 up to 30% by weight paper, and typically from 20-30% paper.

Wood fibers or shavings which have been subjected to defragmentation to pulverize the wood forming expanded fibrous fragments may also be added to the horse muck composition in an amount of from 0 up to 30% by weight and preferably from 10-20% instead of or in addition to the paper. The material once processed by physical reduction and/or steam resembles fuzz or a stringy material.

Cotton may also be used together with wood or paper or instead of same in an amount up to 30% by weight, but less than 10% and more preferably at about 5% in combination with the horse muck and or paper.

A Tackifiers such as a guar and/or polyacrylic compound may be used to hold the particles together upon application to the ground to prevent washing. The tackifier is usually an organic tackifier such as guar, or starch based tackifier or other water soluble polymers. The tackifier acts as a glue to hold the material together. The amount used is dependent upon the slope of the ground to be covered and may vary from 0 up to 10% by weight and more preferably from 2.5 to 7.5%, and most preferably from 5 to 7 percent.

Surfactant up to 1% by weight may also be used to enhance wettability of the paper.

One preferred embodiment contains 100% processed muck and more preferably from 25 to 85 percent processed muck, and more preferably from 50 to 75% processed muck; up to 30 percent paper; and from about 0.5 to 10% tackifiers.

A selected amount of seed, alfalfa meal or peat compost may be added to the horse muck composition or base composition with other selected ingredients to provide a soil replacement composition for treatment of ground which lacks a soil component to grow plants such as clay.

Example 1

A slightly acidic hydro-mulch composition is formed comprising or consisting of or consisting essentially of a major amount of a straw selected from the group consisting of barley straw, oat straw, wheat straw, and combinations thereof mixed with organic waste material comprising at least a minor amount manure and a horse muck consisting of 80 to 99.9 wt % and more preferably 90 to 99 wt. % straw and fibrous material and from 0.1 to 20 wt. % and more preferably from about 1 to 10 Wt. % of urine and animal manure, primarily horse manure having a higher acid content than decomposed horse manure.

The process for producing a hydro-mulch composition from muck comprising at least a major amount of straw and at least a minor amount of organic manure waste, comprising the following steps.

Muck feed material is placed onto a live floor conveyor and screening the muck feed material to remove debris. The muck feed material is fed into an apparatus having rotating beaters for breaking up the muck feed material into smaller particles capable of transfer via a air conveyance system and heated to with hot air to about 450° F. with hot air created by a burner comprising a 4,000,000 BTU gas furnace. The hot air is blown the first hot box dryer and the mechanically conveying a selected volume of smaller particles of muck material is fed through the first hot box dryer on a conveyor at a selected rate of speed for a selected amount of time. The material is pneumatically conveyed at about 35400 to 4500 feet per second with a hot air stream of 250 to 450° F. from the first hot box dryer to remove moist air. The material exiting the dryer is conveyed in a hot air stream with a first cyclone which allows moisture and spent air to escape while material collects into a feed control box there below. The temperature and residence time of the muck feed material is exposed to a hot air stream is controlled with a control apparatus controlling temperature, air flow, and feed flow via an air lock control system. A pull fan provides air flow movement of the heated air with the muck feed material and conveyance to a second dryer box for drying the muck feed material at a selected conveyance rate for a selected time for a selected temperature. The second dryer box comprises a shelf dryer, a collider, a fountain dryer, or a Walker dryer. The preferred Walker dryer incorporates fluffing cylinders whereby heated material suspended in a hot air stream at 3500 to 4500 fps arrives at the second dryer at about 350 to 400° F. and is fluffing cylinders rotate to break up the material within the second dryer to improve surface area and dryer efficiency. The remaining moisture and spent air from the muck feed material is removed with a second cyclone whereby material collects into a second feed control box there below and fed to a size reducing apparatus such as a hammer mill having a screen size of ⅝ inch in order to produce fibers averaging a length of ½ inch or less and vertically fractured fragments producing a hydro-mulch product of a selected size and product of between 8 to 15% moisture and more preferably about 10% moisture.

The process optionally further comprises the steps of mixing the hydro-mulch product with a selected amount of natural fiber containing material to obtain a hydro-mulch product including a selected amount of organic manure waste, a selected amount of straw, and a selected amount of natural filler fiber material comprising a straw, a paper, a wood sawdust, a cotton, a peat, a compost material, an alfalfa meal, a hemp, and combinations thereof.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

We claim:

1. A method of treating a muck containing straw and manure, comprising the steps of:
   first feeding said muck comprising a selected amount of used horse bedding comprising a straw, a horse manure, and a horse urine into a break-up mechanism;
   next feeding said muck into a pneumatic conveyor and exposing said muck to hot air at a temperature of from 250 to 450° F. from a heater conveying and drying said muck;
   pneumatically conveying said muck and hot air to a first cyclone having a blower and conveying said muck removing more moisture and from said muck;
   said muck from said first cyclone is pneumatically conveyed through a first feed control box having a rotary air lock to control said muck feed rate;
   feeding said muck to a dryer and further heating said muck with hot air having a temperature of up to 450° F. for a selected time interval heating said muck to at least 200° F. breaking down lignins and decontaminating said muck preventing germination of a seed and sterilizing said muck;
   processing said muck in a hammer mill vertically fracturing and reducing the size of said muck to a selected size thereby producing a sterilized mulch and fertilizer composition having a moisture content of between 5 to 25 percent moisture.

2. A method of processing an organic mulch and fertilizer composition, comprising the steps of:
   mixing a straw selected from the group consisting of wheat straw, barley straw, oat straw, and combinations thereof with horse muck comprising said straw, a damp green acidic horse manure and a horse urine forming a green mulch composition;

feeding said green mulch composition into a pneumatic conveyor and exposing said green mulch composition to hot air as said green mulch composition is pneumatically conveyed therethrough;

pneumatically conveying said green mulch composition to a first cyclone having a blower conveying said green mulch composition at speeds between 3500-4500 feet per second at a temperature of from 250 to 450° F. drying said green mulch composition removing moisture therefrom;

pneumatically blowing said green mulch composition through a first feed control box having a rotary air lock to control said green mulch composition feed rate;

feeding said green mulch composition into a dryer heating said green mulch composition in said dryer with hot air at a temperature of up to 450° F. for a selected time interval heating said green mulch composition to at least 200° F. breaking down lignins and decontaminating said green mulch composition preventing germination of a seed and sterilizing said green mulch composition; and processing said green mulch composition in a hammer mill vertically fracturing and reducing the size of at least a portion of said green mulch composition to a selected size producing a sterilized organic mulch and fertilizer composition having a moisture content of between 5 to 25 percent moisture.

3. The method of treating said muck of claim 1, further comprising the steps of mixing said sterilized dry mulch product with a selected amount of natural fiber containing material forming a hydro-mulch product including a selected amount of said sterilized dry mulch product and a selected amount of at least one natural filler fiber material consisting of a straw, a paper, a wood sawdust, a cotton, a peat, a compost material, an alfalfa meal, a hemp, and combinations thereof.

4. The method of treating said muck of claim 1, wherein said dryer is selected from the group consisting of a shelf dryer, a collider, a fountain dryer, and a vertical shelf dryer.

5. The method of treating said muck of claim 1, including the step of controlling the temperature and residence time of said muck exposed to said hot air in said rotary air lock by controlling temperature, air flow, and feed flow.

6. The method of treating said green mulch composition of claim 2, wherein said dryer is selected from the group consisting of a shelf dryer, a collider, a fountain dryer, and a vertical shelf dryer.

7. The method of processing said organic mulch and fertilizer composition of claim 2, including the step of heating said muck in said dryer with hot air having a temperature of from about 200-350° F. for about 3-5 minutes.

8. The method of treating said muck of claim 1, including the step of using fluffing cylinders in said dryer for rotating and breaking up said muck to improve surface area and dryer efficiency.

9. The method of treating said muck of claim 1, wherein said mulch and fertilizer composition comprises a plurality of fibers averaging a length of ½ inch or less and vertically fractured fragments having between 10 to 15% moisture.

10. The method of treating said muck of claim 1, including the step of using a pull fan in flow communication with said dryer for providing air flow movement of said hot air with said muck for drying said muck at a selected conveyance rate for a selected time for a selected temperature.

11. The method of treating said muck of claim 1, including the step of feeding said muck to a second cyclone to remove moisture from said hot air after the step of heating said muck in said dryer.

12. The method of treating said muck of claim 11, including the step of feeding said muck into a second feed control box to control said muck feed rate after said second cyclone and prior to feeding said muck to said hammer mill.

13. The method of treating said muck of claim 1, wherein said heater comprises a gas turbine generator.

14. The method of processing said organic mulch and fertilizer composition of claim 2, wherein said heater comprises a gas turbine generator.

15. The method of processing said organic mulch and fertilizer composition of claim 2 including the step of mixing said sterilized organic mulch and fertilizer composition with a selected amount of water forming a mulch slurry and spraying said mulch slurry over bare ground with a plurality of seeds to establish ground cover for retaining moisture.

16. The method of processing said organic mulch and fertilizer composition of claim 2, including the step of using fluffing cylinders in said dryer for rotating and breaking up said green mulch composition to improve surface area and dryer efficiency.

17. The method of processing said organic mulch and fertilizer composition of claim 2 including the step of pulling hot air through said dryer with a fan.

18. The method of processing said organic hydro-mulch and fertilizer composition of claim 2, including the step of milling said green mulch composition in said hammer mill vertically fracturing and reducing the size of at least a portion of said green mulch composition to a selected size of about one-half inch long increasing the surface area, increasing absorption of moisture and increasing expansion of said green mulch composition when mixed with water.

19. The method of processing said organic mulch and fertilizer composition of claim 2, including the step of feeding said green mulch composition from said dryer to a second cyclone prior to processing in said hammer mill to remove moisture from said green mulch composition.

20. The method of processing said organic mulch and fertilizer composition of claim 2, including the step of feeding said green mulch composition into a second feed control box after said second cyclone and prior to said hammer mill to control the feed rate to said hammer mill.

21. The method of processing said organic mulch and fertilizer composition of claim 2 including the step of adding a chemical fertilizer.

22. The method of processing said organic mulch and fertilizer composition of claim 2 including the step of adding a plurality of seeds.

23. The method of treating said muck of claim 1 including the step of adding a chemical fertilizer.

24. The method of treating said muck of claim 1 including the step of adding a plurality of seeds.

* * * * *